Figure 3:
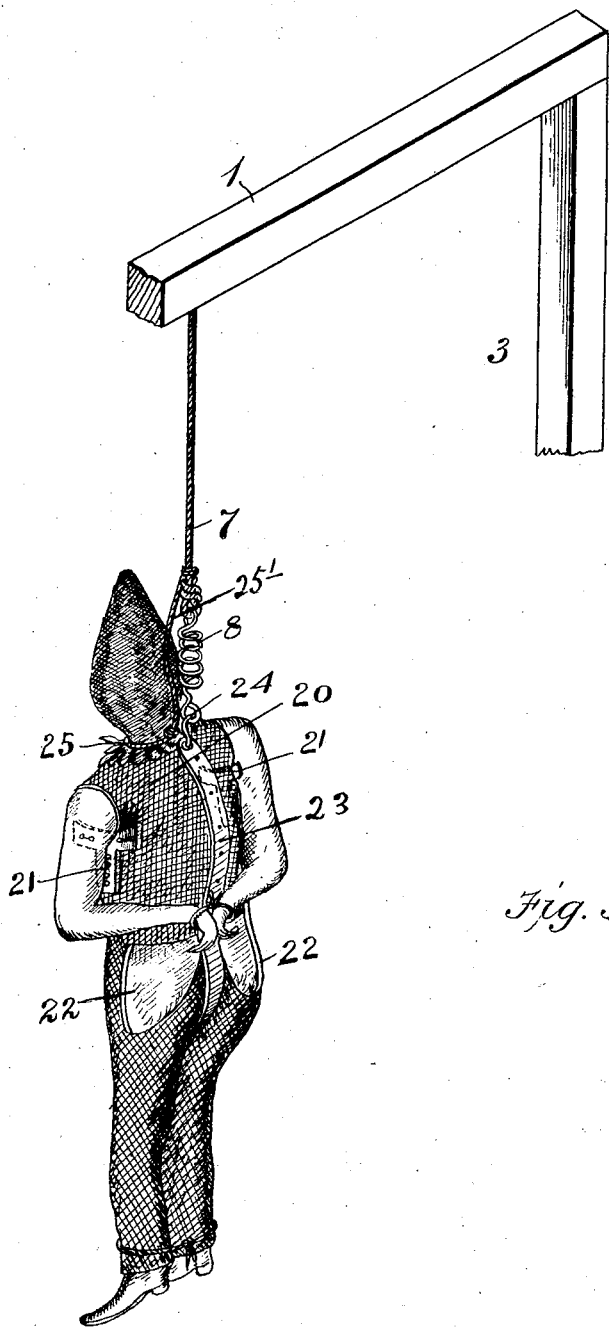

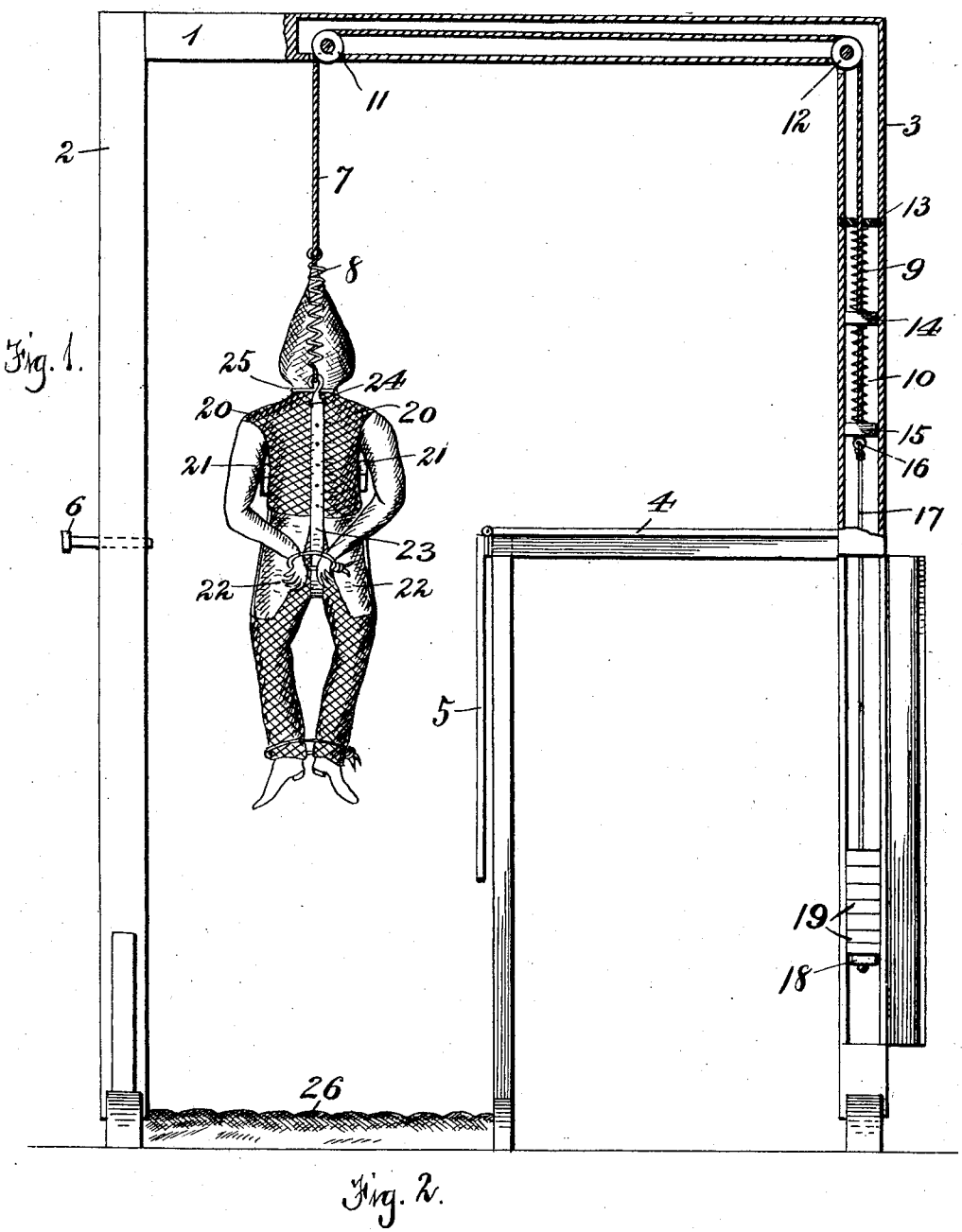

No. 765,170. PATENTED JULY 19, 1904.
J. J. DUFFIE.
BURLESQUE HANGING MACHINE.
APPLICATION FILED OCT. 8, 1903.
NO MODEL. 2 SHEETS—SHEET 2.

Witnesses
F. L. Orrand
Belle C. Trott

Inventor
John J. Duffie
By John S. Duffie
Attorney

No. 765,170. Patented July 19, 1904.

UNITED STATES PATENT OFFICE.

JOHN JEFFERSON DUFFIE, OF LOS ANGELES, CALIFORNIA.

BURLESQUE HANGING-MACHINE.

SPECIFICATION forming part of Letters Patent No. 765,170, dated July 19, 1904.

Application filed October 8, 1903. Serial No. 176,325. (No model.)

*To all whom it may concern:*

Be it known that I, JOHN JEFFERSON DUFFIE, a citizen of the United States, residing at Los Angeles, in the county of Los Angeles and State of California, have invented new and useful Improvements in Burlesque Hanging-Machines, of which the following is a specification.

My invention relates to a burlesque hanging-machine, and is to be used in initiatory work in secret organizations, theaters, and other places of public amusement, and is so constructed that the party supposed to be hanged and operated on by this piece of burlesque mechanism cannot be injured in the slightest degree.

It is intended in secret organizations to test the bravery and fortitude of the applicant and to test his confidence in his friends and in theaters and in other places of amusement to represent a real hanging.

In the accompanying drawings, Figure 1 represents an elevation of my invention with the subject hanging. Fig. 2 represents a perforated T-shaped brace. Fig. 3 is another view of the device in perspective.

My invention is described as follows:

1 represents the horizontal beam of a gallows.

2 and 3 represent the upright beams, to the upper ends of which is secured the said cross-beam 1.

4 represents the platform on which the hangman stands; 5, the trap on which the subject stands before he is supposed to be executed; 6, a pin which passes through the upright post 2. The said trap 5 is hinged at one end of said platform 4, while its free end rests on the said pin 6, and when the said pin 6 is withdrawn the free end of the trap falls, and the subject dangles in the air.

7 represents a rope covered with a black elastic covering; 8, 9, and 10, strong spiral springs. The upper end of spring 8 is attached to the hanging end of the rope, while its lower end is secured to a hook at the back of the subject's neck.

2 represents the solid upright beam, and 3 the hollow upright beam. On the upper ends of these beams is secured horizontally a cross-beam 1, which is hollow about three-fourths of its length. In the hollow of said cross-beam 1 and immediately over the pit of the hanging-machine is journaled a roller 11, and the rope is carried from the spring 8, over the said roller 11, thence over roller 12 at the junction between the hollow end of beam 1 and the upper and hollow end of beam 3, thence downwardly through the stop 13 and the blocks 14 and 15. The stop 13 is secured in the hollow of beam 3 and is stationary. The blocks 14 and 15 are movable in said hollow. The rope is formed into a knot 16 immediately below the block 15, so that it cannot be drawn up through said block, and to this knot is secured the upper end of the rod 17, the lower end extending downwardly in the hollow of said beam and having secured on its lower end a rest 18. Resting on this rest 18 in the hollow of said beam and around said rod are weights 19. These weights are the same shape of the weights used in platform-scales and may be put on and taken off at will and are made of different weights—say one hundred, seventy-five, fifty, twenty-five, and so on down—so that the subject may be balanced in the hanging-machine.

Coiled around the rope 7 and having its upper end resting against the lower face of the stop 13 and its lower end against the upper face of the block 14 is a spiral spring 9, and coiled around said rope and resting between said blocks 14 and 15 is another coil-spring 10. The object of said springs is to break the force and jar that would otherwise be sustained by the subject when the trap is thrown.

The object of the weights 20 is to decrease the momentum of the falling subject. For instance, if the man weighs two hundred pounds and the weights weigh one hundred and ninety pounds, the resistance met by the fall of the man would be equal to the momentum of ten pounds only, which is still further reduced by the springs 8, 9, and 10.

20 is a jacket which fits around the upper part of the body of the subject, and secured to this jacket and fitting under each arm is a perforated and padded T-shaped brace 21, and extending from this jacket downwardly are two hip-pads 22, connected to said jacket, and to these pads, secured to said jacket back and front and passing down between the legs of the subject is a strap 23, and to the rear and upper end of this strap is a hook 24. The object of this jacket, pads, and strap is is to distribute the weight of the body when suspended.

25 represents a hangman's noose placed around the neck and is attached to the rope 7 by a small string 25' just above the spring 8 or just below the hook 24 when the spring 8 is not used; but if the said spring is used the string may be dispensed with. Said noose is so attached by said small string that it would break immediately when the subject drops. If in the drop the hook 24 should accidentally break, the said small string will also break, and consequently the man would fall only a few feet on the mattress 26 below. A soft pad may be placed between the end of the rope or the spring and the man's head to keep the rope from hurting him.

The object of my invention is to give all the appearances of a real hanging. It will be easily seen that by the application of the above apparatus this can be accomplished. This fact has been actually demonstrated by experiment made with this mechanism. I have said that the rope is covered with black elastic; but this is no part of the invention and is not absolutely necessary and may be dispensed with, and I may also dispense with the spring 8, because the springs 9 and 10 may be made of sufficient length and with sufficient resiliency to prevent the sudden jar when the trap falls. I may also substitute other means than the pin 6 for holding and throwing the trap and may make slight changes in the details above described, because I maintain that my burlesque hanging-machine is broadly new.

Having described my invention, what I claim as new, and desire to secure by Letters Patent, is—

1. A burlesque hanging-machine, consisting of a solid upright beam 2; a hollow upright beam 3; a hollow cross-beam 1, secured on the upper ends of said beams; a pulley 11, journaled in the hollow of said beam 1, immediately over the pit of the machine; a pulley 12, journaled in the hollow and at the junction of the beams 1 and 3; a platform 4, extending from the beam 3; a pin 6, passing through the beam 2, on a line with the platform 4; a trap having one end hinged to the platform 4, and the other adapted to rest on the pin 6; a stop 13, secured in the hollow of beam 3, some distance from the upper end; sliding blocks 14 and 15, fitting in the hollow of said post, some distance below the stop 13; a rope adapted to have secured to one end, a subject, and passing up over pulleys 11 and 12, thence down through stop 13, and down through blocks 14 and 15; a rod 17, having one end secured to the rope below the block 15, its other passing down in the hollow of said post, and having secured on its lower end, a rest 18; weights 19, resting on said rest, around said rod, and adapted to be moved up and down in the hollow of said beam; spiral springs 9 and 10, coiled around said rope and operating between stop 13, and blocks 14 and 15, substantially as shown and described, and for the purposes set forth.

2. In a burlesque hanging device substantially as shown and described, a jacket 20, fitting around the person of the subject; perforated, padded braces, secured to said jacket, one under each arm; hip-pads 22, secured to the lower part of said jacket; strap 23, passing down between the legs of the subject and secured to the jacket, back and front; a rope 7, a hook 24, secured to the rear and upper end of said jacket, adapted to be secured to the hanging end of rope 7, substantially as shown and described, and for the purposes set forth.

In testimony whereof I have signed my name to this specification in the presence of two subscribing witnesses.

JOHN JEFFERSON DUFFIE.

Witnesses:
M. M. MEYERS,
THOS. I. GALLOWAY.